(12) United States Patent
Khatchatrian et al.

(10) Patent No.: US 6,368,641 B1
(45) Date of Patent: Apr. 9, 2002

(54) LACTIC ACID BACTERIA AND FOOD PRODUCTS

(75) Inventors: Robert Khatchatrian; Tigran Khatchatrian, both of Glendale, CA (US)

(73) Assignee: Hartz International Inc., Glendale, CA (US)

( * ) Notice: Subject to any disclaimer, the term of this patent is extended or adjusted under 35 U.S.C. 154(b) by 0 days.

(21) Appl. No.: 09/562,706

(22) Filed: Apr. 28, 2000

(51) Int. Cl.⁷ .............................. A23L 1/20; A23C 9/127; C12N 1/20

(52) U.S. Cl. .......................... 426/46; 426/61; 426/580; 435/252.4

(58) Field of Search .............................. 426/46, 61, 43, 426/52, 2, 634, 565, 580; 424/93.45, 439; 435/854, 252.9, 253.4, 252.4

(56) References Cited

U.S. PATENT DOCUMENTS

| 4,147,773 A | 4/1979 | Ogasa .......................... 424/93 |
| 5,482,723 A | 1/1996 | Sasaki et al. .................. 426/43 |
| 5,514,656 A | 5/1996 | Cope et al. .................... 514/21 |
| 5,800,830 A | 9/1998 | Asano et al. ................ 424/439 |
| 5,912,040 A | 6/1999 | Girsh .......................... 426/583 |
| 6,156,320 A | * 12/2000 | Izekova et al. ........ 424/197.11 |

FOREIGN PATENT DOCUMENTS

| GB | 2 076 424 A | | 12/1981 |
| RU | 2108723 | * | 4/1998 |
| RU | 2141210 | * | 11/1999 |
| RU | 2146456 | * | 3/2000 |

* cited by examiner

*Primary Examiner*—Keith Hendricks
(74) *Attorney, Agent, or Firm*—Knobbe, Martens, Olson & Bear LLP

(57) ABSTRACT

The present invention relates to lactic acid food products comprising *Lactobacillus acidophilus* Strain 317/402 and soy milk.

10 Claims, No Drawings

US 6,368,641 B1

LACTIC ACID BACTERIA AND FOOD PRODUCTS

BACKGROUND OF THE INVENTION

1. Field of the Invention

The present invention relates to lactic acid food products comprising *Lactobacillus acidophilus* Strain 317/402 and soy milk.

2. Description of the Related Art

Lactic acid food products, such as milk and yogurt, are used both as a part of a normal diet and for the medical treatment of children and adults suffering from a variety of health problems ranging from gastrointestinal disorders to pulmonary disease and allergies. Lactic acid food products are used in medicine both for their basic nutritive value, and for the physiologically active substances they contain.

Cultured lactic acid food products such as cottage cheese, sour cream, buttermilk and yogurt are well known. In addition, dry lactic acid food products are known. However, many of these products do not have sufficient nutritive value to be of medical use. One reason for this is that in making cultured lactic acid food products only mesophylic and thermophylic streptococcus, or lactobacteria with low activity are used. These cultures weakly synthesize vitamins and other useful nutrients. Such products provide only a transitory lactic acid microflora in the intestine of the person consuming them and thus are not useful in medical treatments.

Moreover, the majority of lactic acid food products contain lactose. This restricts their use by people suffering from lactose intolerance due to a deficit in the lactatedehydrogenase enzyme. The high level of cholesterol in such products also reduces their medical value.

A number of lactic acid food products are known in the art. Sour cream and cottage cheese made from cows milk supplemented with cultures of mesophylic and thermophylic lactic acid streptococcus or an admixture of pure cultures of *Lactobacillus acidophilus* and flavoring streptococcus have been described in several patents. Patent of Russian Federation No. 2072228; Patent of Russian Federation No. 2100935. The weak synthesis of vitamins and other useful nutrients, as well as the high lactose concentration explain the insufficient dietary and medical value of these products.

Lactic acid food product desserts have also been described. Patent of Russian Federation No. 2007091; U.S. Pat. No. 5,800,830. These products contain dairy products, stabilizer, sweetening agent and a concentrate of low activity Bifidobacterium.

An ice cream that includes the lactic acid Streptococcus bacteria has been described. Japan Appl. No. 59-020339. However, this product provides only transitory lactic acid microflora in the intestine of the person consuming it. In addition, it has weak antacid properties and thus is of limited use in treating persons suffering from gastrointestinal diseases such as gastritis, hyperemia and ulcer of a stomach.

The process of producing a dairy drink that restores electrolyte balance is also known. The drink contains a source of vitamins and minerals and may be consumed by people with allergies to dairy products. U.S. Pat. No. 5,912,040. The drink is produced by a traditional method of milk or whey processing that lowers the protein concentration. However, this traditional process does not produce a food product with medical uses.

Powdered or pelleted lactic acid food products are also known. Patent of Great Britain No. 2076424; U.S. Pat. No. 4,147,773; Patent of Russian Federation No. 2083122. However, upon dissolution in water or milk, the bacteria in these products have a reduced ability to adhere to the epithelium of the digestive tract. This is explained by the fact that the Bifidobacteria are in a state of anabiosis after lyophilization. The process of transition of the lyophilized bacteria to the active physiological state takes 6–8 hours. Thus if the product is consumed shortly after being dissolved it will pass through the intestine without providing any beneficial effect from the bacteria. This lengthy transition to the active state complicates the preparation of the product when it is to be used for medical treatments. Additionally, only a single culture of lactic acid bacteria is used in these products, considerably reducing the nutritive and treatment value.

Recently many lactic acid food products have appeared on the market with reduced lactose concentrations. These products allow dairy intolerant people to benefit from the promotion of normalized intestinal microflora that is associated with their consumption. Products for enteral feeding containing hydrolysate of soy protein and intact soy protein have been described. One liquid product contains a minimum of 50% hydrolysate of soy protein and has a pH of 6.4 to 6.6. U.S. Pat. No. 5,514,615. Another contains 60 to 90% hydrolysate of soy protein and is used for the enteral feeding during radiation therapy or chemotherapy. U.S. Pat. No. 5,514,656. However, the preparation of these products is very labor intensive because the soy protein is first dissolved and then the hydrolysate is cleared with heat treatment. In addition, the products are not intended for everyday usage unless so prescribed.

To improve both the medical and organoleptic properties of these soy-based products, sugars, vitamins and other substances must be added. This allows the use of these products both as part of a diet and as part of a medical treatment to promote the growth of the natural microflora of intestine and to lower cholesterol levels in the blood.

*Streptococcus salivarius* can serve in a starter for fermented milk products. It is known that this species of lactic acid producing bacteria produces an antibacterial substance. Thus the use of *Streptococcus salivarius* in a starter for fermented milk products inhibits the growth of any other lactic acid producing bacteria present in the starter during fermentation. U.S. Pat. No. 5,482,723.

A composition for the production of an albuminous lactic acid food product has been previously described by the authors. Patent of Russian Federation No. 2,128,444. In the lactic acid food product of this patent, a combination of *Lactobacillus acidophilus*, strain 317/402 and the lactic acid producing streptococci *S. lactis, S. citravorus* and *S. thermophilus* was used as a starter. This starter is added to a mixture of cow milk and soy milk. However, only a circumscribed assortment of products has been made with this starter.

The aim of the present invention is to produce a variety of lactic acid products suitable for everyday consumption (sour cream, cottage cheese, lactic acid desserts, dry drinks) that also have an increased medical utility.

SUMMARY OF THE INVENTION

The present invention relates to lactic acid food products that are made from a soy milk basis and comprise *Lactobacillus acidophilus* strain 317/402. *Lactobacillus acidophilus* strain 317/402 may be part of a starter that also comprises *Lactobacillus acidophilus* non-mucus dew, *Streptococcus cremoris, Streptococcus diacetilactis* and

*Lactobacillus salivarius*. The starter may be added to soy milk or a mixture of soy milk and dairy milk to produce a lactic acid food product.

DETAILED DESCRIPTION OF THE PREFERRED EMBODIMENT

The present invention relates to lactic acid food products comprising *Lactobacillus acidophilus* Strain 317/402 and soy milk. A lactic acid food product is any food product containing lactic acid. Several examples are milk, cottage cheese, yogurt and ice cream. However, the term lactic acid food product is not limited to these examples.

A starter is a mixture comprising one or more species of bacteria that is used to initiate a culture. The lactic acid food products of the present invention are made from a starter comprising *Lactobacillus acidophilus* Strain 317/402. The starter may also comprise *Lactobacillus acidophilus* (nonmucous dew), *Lactobacillus salivarius, Streptococcus diacetilactis* and *Streptococcus cremoris*. The ratio of these bacteria in the mixture will vary depending on the lactic acid food product in which it is used.

The lactic acid food products of the present invention are a good source of a number of useful biologically active substances such as vitamins and amino acids. Thus the administration of these products to people can improve their general nutrition. In addition they have an antacid property and are beneficial in the treatment of gastrointestinal illness.

*Lactobacillus acidophilus* has the advantage of being better at adapting to the large intestine than other lactic acid producing bacteria. In addition, the *Lactobacillus acidophilus* bacteria may be useful because it produces a significant amount of a compound with antibiotic activity while being harmless to both children and adults. The antibiotic properties of *Lactobacillus acidophilus* may be boosted by co-culturing it with Streptococcus in milk. This appears to stimulate growth on the part of both species. Thus in co-culture, the acid forming properties of each strain are enhanced.

*Lactobacillus acidophilus* strain 317/402 was first isolated by means of directed selection in Russia in 1963. The initial culture was isolated from the feces of a healthy, newborn infant. The bacteria of this strain are microaerophylic, Gram-positive, homofermentative and immovable. This strain is capable of producing an antbacterial compound that is harmless to people. When cultured in milk or soy-milk, the strain increases the concentrations of vitamins in the milk.

Other strains of bacteria that may be used in the lactic acid food products of the present invention are chosen based on several important properties. Their ability to produce acid and their influence on the taste smell, color and consistency of the lactic acid food product are important as is their ability to produce vitamins, amino acids and aromatic compounds. In addition, any antibiotic effects are important both for the health benefit they may provide and because of the effect they may have on the other bacteria in the culture. If the lactic acid food products are to be used for medical purposes, it is also important that the bacteria be able to form an active population in the intestine of a person consuming the product. Thus it is also preferable if the bacteria in the culture are resistant to any therapeutic drugs that might be present in the body. Finally, the ability to store an active starter in both liquid and dry form is important.

The lactic acid food products of the present invention are produced by adding the starter comprising *Lactobacillus acidophilus* strain 317/402 to soy-milk or a mixture of dairy milk and soy-milk. The use of soy-milk augments the production of several amino acids (cystine and methionine) and increases the ratio of potassium ions to sodium ions. This may be beneficial to the energy levels and general health of a person consuming the resulting lactic acid food product. In addition, the use of soy-milk in place of dairy milk reduces any reaction in people suffering from lactose intolerance.

The strain 317/402 of *Lactobacillus acidophilus* synthesizes more vitamins than other strains of *Lactobacillus acidophilus* when used as part of a starter to produce a lactic acid food product. The vitamins synthesized by the strain 317/402 include folic acid, thiamine and riboflavin. In addition, strain 317/402 also synthesizes gamma-interferon, thus further increasing the useful properties of lactic acid food products made with the starter of the present invention.

The creamy bacterias *Streptococcus cremoris* are useful in the production of cottage cheese, sour cream and other lactic acid food products.

The bacteria *Streptococcus diacetilactis* are useful in the preparation of cottage cheese, sour cream and some other lactic acid food products because of their symbiotic relationship with *Lactobacillus acidophilus*. *Streptococcus diacetilactis* are also used because of their ability to be cultured in a broad temperature range and to synthesize aromatic compounds that improve the aesthetic qualities of the product.

*Lactobacillus salivarius* is used in the starter to improve the aesthetic properties of the lactic acid food products and because it improves fermentation. In addition, *Lactobacillus salivarius* produces vitamins and some enzymes.

EXAMPLE 1

Cottage cheese is one of the lactic acid food products contemplated by the present invention. The cottage cheese is made using standard techniques with the following changes. Soy-milk serves as the basis and the starter comprising *Lactobacillus acidophilus* strain 317/402 is used. A coagulant may also be used. Preferably, the coagulant is calcium chloride. The coagulant may be added directly to the soy-milk basis in an amount of 0.05 to 1% by mass. More preferably the coagulant will be added in an amount of 0.1 to 0.4% by mass. The starter is then added to the soy-milk basis in an amount of 1 to 20% by mass to produce a culture. More preferably the starter is added to the basis in an amount of 3 to 5% by mass.

Preferably, in addition to *Lactobacillus acidophilus* strain 317/402, the starter also contains *Lactobacillus acidophilus* (non-mucous dew), *Streptococcus cremoris, Streptococcus diacetilactis* and *L. Salivarius*. The bacteria are preferably in the ratio of (0.2–7):(0.1–6):(0.05–5):(0.02–4):(0.02–4). More preferably the bacteria in the will be in the ratio (0.9–1.1):(0.7–0.9):(0.4–0.6):(0.2–0.4):(0.2–0.4).

After addition of the starter and the coagulant the culture is heated at a temperature of 10 to 50° C. until a clot acidity of 20 to 140° T is reached. More preferably, the culture is heated at a temperature of 22 to 27° C. until a clot acidity of 70 to 100° T is reached.

EXAMPLE 2

Sour cream is another lactic acid food product contemplated by the present invention and is prepared using standard techniques. This includes separating cream from dairy milk, adding soy milk, pasteurizing, and introduction of the starter. The starter is added in an amount of 1 to 20% by mass to produce a culture. More preferably the starter is added to the basis in an amount of 3 to 5% by mass.

Preferably, in addition to *Lactobacillus acidophilus* strain 317/402, the starter also contains *Lactobacillus acidophilus* (non-mucous dew), *Streptococcus cremoris, Streptococcus diacetilactis* and *L. Salivarius*. The bacteria are preferably in the ratio of (0.2–7):(0.1–6):(0.05–5):(0.02–4):(0.02–4) More preferably the bacteria in the will be in the ratio (0.9–1.1):(0.7–0.9):(0.4–0.6):(0.2–0.4):(0.2–0.4).

In addition, prior to pasteurization soy-milk is preferably added in an amount of 1 to 75% by mass. More preferably soy-milk is added in an amount of 10 to 30% by mass. After the addition of the starter, the culture is heated at a temperature of 10 to 50° C. until a clot acidity of 20 to 140° T is reached. More preferably, the culture is heated at a temperature of 22 to 27° C. until a clot acidity of 70 to 100° T is reached.

EXAMPLE 3

Lactic acid food product desserts, such as ice cream, are also contemplated by the present invention. The lactic acid food product dessert may be prepared by any method known in the art. The dessert comprises polysaccharides, components for improving the taste, smell and appearance of the product, a basis of soy-milk and dairy milk and starter comprising *Lactobacillus acidophilus* strain 317/402. Preferably, in addition to *Lactobacillus acidophilus* strain 317/402, the starter also contains *Lactobacillus acidophilus* (non-mucous dew), *Streptococcus cremoris, Streptococcus diacetilactis* and *L. Salivarius*. These bacteria are preferably present in the ratio of (0.2–7):(0.1–6):(0.05–5):(0.02–4): (0.02–4). More preferably the bacteria in the starter will be in the ratio (0.9–1.1):(0.7–0.9):(0.4–0.6):(0.2–0.4): (0.2–0.4).

The polysaccharide used in the dessert may be any known in the art. Two examples are chitosan gel and inulin from Helianthus tuberoses. Chitosan is the product of chitin acylation. It is known that chitosan can stimulate the immune system. For example, it is used as an adjuvant for immunizing agents with the purpose of rising of antibodies in an organism. Japanese Patent No. 62-61927. In addition, chitosan is known to stimulate development Lactobacillus bifidum in the gut (Japanese Patent No. 62-61927) and to control acidity in the stomach.

Inulin is a polymer homologue of fructose. The main source of inulin is tubers of Helianthus tuberoses. Inulin is known to be beneficial in the regulation of metabolism.

In one example of a lactic acid food product dessert, the starter makes up 0.1 to 30% of the dessert by mass. Polysaccharide makes up from 0.5 to 25% of the dessert by mass. Components that improve the aesthetic properties of the desert (taste, smell, texture, color) make up from 7 to 30% of the desert. The remainder of the dessert is made up of the soy-milk/dairy-milk base.

Components that may be added to improve the aesthetic properties of the dessert include but are not limited to sugar, vanillin, chocolate, liquor and natural or artificial flavorings.

EXAMPLE 4

Dried variants of lactic acid food products of the present invention are also contemplated. A dried variant would comprise dried lactic acid bacteria of the starter of the present invention and dried soy milk. The will include the dry biomass of *Lactobacillus acidophilus*, the strain 317/402 with a titer of $10^7$ to $10^{10}$ units/gram as a concentrate or a mixture of the dry biomass of Bifidobacterium bifidum with the dry biomass of *Lactobacillus acidophilus* strain 317/402 in the ratio of not more than 1:1 with a titer of $10^7$ to $10^{10}$ units/gram. Additionally, the dried variant comprises components that improve the aesthetic properties of the product and components that improve the reconstitution of active bacteria. The components that improve the aesthetic properties may include natural or artificial flavorings and sugar. The components that improve reconstitution of active bacteria may include dried soy milk, dried dairy milk, dried glucose and dried egg white. The dried lactic acid bacteria would preferably make up from 1 to 50% of the dried variant by mass.

EXAMPLE 5

Description of cottage cheese made with the starter of the present invention:

Exterior:

Surface rough, pure, wet.

Taste and Odor:

Pure, with weak soy taste, no extraneous odor.

Color:

White or cream, even.

Biochemical analysis of cottage cheese made with the starter of the present invention:

| Soy milk alone (control) | |
|---|---|
| Thiamin, mkg/l | 260–340 |
| Riboflavin, mkg/l | 800–1300 |
| Biotin, mkg/l | 3.0–3.5 |
| Pyridoxine, mkg/l | 290–310 |
| Nicotinic acid, mkg/l | 340–370 |
| Folic acid, mkg/l | 850–897 |
| Pantothenic acid, mkg/l | 1500–1750 |
| Choline, mg/l | 210–250 |
| Ascorbic acid, mg% | 0.20–0.25 |
| Lactose, % | absent |

| Cottage cheese of the present invention | |
|---|---|
| Thiamin, mkg/l | 400–490 |
| Riboflavin, mkg/l | 950–1450 |
| Biotin, mkg/l | 3.5–4.0 |
| Pyridoxine, mkg/l | 370–410 |
| Nicotinic acid, mkg/l | 395–475 |
| Folic acid, mkg/l | 870–910 |
| Pantothenic acid, mkg/l | 1130–1630 |
| Choline, mg/l | 300–390 |
| Ascorbic acid, mg% | 0.91–1.05 |
| Lactose, % | absent |

The amino acids determine the alimentary value of the product. The cottage cheese of the present invention contains a broad spectrum of essential amino acids.

Accumulation of amino acids in cottage cheese made with the starter of the present invention:

| | Soy Milk (control) | Cottage Cheese |
|---|---|---|
| Lysine | 0.71 | 2.51 |
| Threonine | 0.57 | 0.57 |
| Arginine | 2.41 | 4.57 |

-continued

|  | Soy Milk (control) | Cottage Cheese |
|---|---|---|
| Valine | 5.74 | 6.71 |
| Methionine | 1.72 | 2.11 |
| Isoleucine | 5.73 | 7.23 |
| Leucine | 8.97 | 10.27 |
| Phenylalanine | 4.97 | 7.15 |

EXAMPLE 6

Description of sour cream of the present invention.

When the sour cream contains 30% fat:

Homogeneous, dense consistency, lustrous appearance.

Pure lactic acid taste with the taste and aroma of a pasteurized product.

White color.

When the sour cream contains 20% fat:

Homogenous, moderately dense consistency, slightly viscous with some air bubbles.

Pure lactic acid taste with a slight taste of soy.

White color.

When the sour cream contains 10% fat:

Homogeneous, moderately dense consistency, slightly viscous with some air bubbles.

Pure lactic acid taste. Slightly sweet taste. Slight taste of additive.

Color varies with the additive.

Biochemical analysis of sour cream made with the starter of the present invention:

| Control Sour Cream (dairy milk alone) | |
|---|---|
| Thiamin, mkg/l | 350–390 |
| Riboflavin, mkg/l | 989–1570 |
| Biotin, mkg/l | 3.7–3.9 |
| Pyridoxine, mkg/l | 310–320 |
| Nicotinic acid, mkg/l | 375–400 |
| Folic acid, mkg/l | 900–970 |
| Pantothenic acid, mkg/l | 1500–1750 |
| Choline, mg/l | 230–270 |
| Ascorbic acid, mg% | 0.25–0.29 |
| Lactose, % | 4.0–4.7 |

| Sour Cream of the present invention | |
|---|---|
| Thiamin, mkg/l | 650–870 |
| Riboflavin, mkg/l | 1700–2100 |
| Biotin, mkg/l | 4.1–4.7 |
| Pyridoxine, mkg/l | 350–430 |
| Nicotinic acid, mkg/l | 405–480 |
| Folic acid, mkg/l | 1270–1750 |
| Pantothenic acid, mkg/l | 1850–2300 |
| Choline, mg/l | 310–420 |
| Ascorbic acid, mg% | 1.20–1.37 |
| Lactose, % | 1.0–1.45 |

Accumulation of amino acids in sour cream made with the starter of the present invention:

| Free amino acids | | |
|---|---|---|
|  | control | Sour Cream of present invention |
| Lysine | 0.89 | 3.71 |
| Arginine | 3.17 | 5.97 |
| Threonine | 0.83 | 1.07 |
| Valine | 6.27 | 7.73 |
| Methionine | 1.85 | 3.07 |
| Isoleucine | 5.96 | 7.53 |
| Leucine | 9.07 | 11.73 |
| Phenylalanine | 5.31 | 7.88 |

EXAMPLE 7

Below are several examples of desserts contemplated by the present invention:

|  | % |
|---|---|
| A. Ice Cream | |
| Starter | 0.1 |
| Chitosan - gel | 20.0 |
| Saccharose | 10.0 |
| Chocolate | 3.0 |
| Vanillin | 0.01 |
| Soy milk | the rest up to 100% |
| B. Ice cream | |
| Starter | 15.0 |
| Inulin of Helianthus tuberoses | 10.0 |
| Saccharose | 14.0 |
| Chocolate | 1.0 |
| Vanillin | 0.1 |
| Soy milk | the rest up to 100% |
| C. Ice cream | |
| Starter | 20.0 |
| Chitosan - gel | 20.0 |
| Saccharose | 12.0 |
| Chocolate | 2.0 |
| Vanillin | 0.05 |
| Mixture cow/soy milk in the ratio of not less than 1:1 | the rest up to 100% |
| D. Frozen yogurt | |
| Starter | 0.1 |
| Chitosan - gel | 25.0 |
| Saccharose | 10.0 |
| Flavor additives | 20.0 |
| Soy milk | the rest up to 100% |
| E. Frozen yogurt | |
| Starter | 30.1 |
| Chitosan gel | 15.0 |
| Saccharose | 7.0 |
| Flavor additives | 15.0 |
| Soy milk | the rest up to 100% |
| F. Frozen yogurt | |
| Starter | 20.1 |
| Inulines of Helianthus tuberoses | 20.0 |
| Saccharose | 5.0 |
| Flavor additives | 15.0 |
| Mixture of cow/soy milk (1:1) | the rest up to 100%. |
| G. Dessert cocktail | |
| Starter | 0.1 |
| Chitosan gel | 15.0 |
| Saccharose | 10.0 |

-continued

|  | % |
|---|---|
| Flavor additives | 15.0 |
| Cream for cocktail | 5.0 |
| Soy milk | the rest up to 100% |
| H. Dessert cocktail | |
| Starter | 10.0 |
| Chitosan (gel) | 5.0 |
| Saccharose | 5.0 |
| Flavor additives | 10.0 |
| Cream for cocktail | 2.0 |
| Soy milk | the rest up to 100% |
| I. Dessert cocktail | |
| Starter | 7.0 |
| Inulin of Helianthus tuberoses | 11.1 |
| Saccharose | 7.0 |
| Fruit-berry additives | 12.0 |
| Cream for cocktail | 4.0 |
| Mixture of cow/soy milk in the ratio of not less 1:1 | the rest up to 100% |

EXAMPLE 8

Examples of dried lactic acid food products made with the starter of the present invention:

|  | % |
|---|---|
| A. Dry lactic acid food product | |
| Starter | 35.0 |
| Flavoring | 15.0 |
| Saccharose | 10.0 |
| Dry soy milk | the rest up to 100% |
| B. Dry lactic acid food product | |
| Starter | 0.1 |
| Flavoring | 35.0 |
| Carbohydrate component of glucose syrup | 10.0 |
| Dry soy milk | the rest up to 100% |
| C. Dry lactic acid food product | |
| Starter | 1.0 |
| Flavoring | 25.0 |
| Carbohydrate component of glucose syrup | 15.0 |
| Dry dairy milk | 25.0 |
| Dry soy milk | the rest up to 100% |
| D. Dry lactic acid food product | |
| Starter | 40.0 |
| Flavoring | 35.0 |
| Saccharose | 10.0 |
| Dry egg white | the rest up to 100% |
| E. Dry lactic acid food product | |
| Starter | 0.1 |
| Flavoring | 25.0 |
| Carbohydrate component of glucose syrup | 10.0 |
| Dry soy milk | the rest up to 100% |
| F. Dry lactic acid food product | |
| Starter | 1.5 |

-continued

|  | % |
|---|---|
| Flavoring | 25.0 |
| Carbohydrate component of glucose syrup | 15.0 |
| Dry egg white | 25.0 |
| Dry soy milk | the rest up to 100% |
| G. Dry lactic acid food product | |
| Starter | 50.0 |
| Ascorbic acid | 1.0 |
| Carbohydrate component of glucose syrup | 10.0 |
| Dry soy milk | the rest up to 100% |
| H. Dry lactic acid food product | |
| Starter | 3.0 |
| Flavoring | 25.0 |
| Saccharose | 15.0 |
| Dry egg white | 10.0 |
| Dry dairy milk | 15.0 |
| Dry soy milk | the rest up to 100% |
| I. Dry lactic acid food product | |
| Starter | 2.0 |
| Flavoring | 25.0 |
| Carbohydrate component of glucose syrup | 15.0 |
| Dry egg white | 25.0 |
| Dry soy milk | the rest up to 100% |

What is claimed is:

1. A starter for use in producing lactic acid food products comprising:

*Lactobacillus acidophilus* strain 317/402; and

*Lactobacillus acidophilus* non-mucus producing strain; and

*Streptococcus diacetilactis*; and

*Lactobacillus salivarius*.

2. The starter of claim 1 wherein the bacteria are in the ratio of (0.9–1.1):(0.7–0.9):(0.4–0.6):(0.2–0.4):(0.2:0.4).

3. A lactic acid food product comprising the starter of claim 1.

4. The lactic acid food product of claim 3 further comprising soy milk.

5. A method of making a lactic acid food product comprising adding the starter of claim 1 to soy milk.

6. A method of making a lactic acid food product comprising adding the starter of claim 1 to a mixture of soy-milk and dairy milk.

7. The lactic acid food product of claim 3, wherein said lactic acid food product is cottage cheese.

8. The lactic acid food product of claim 3, wherein said lactic acid food product is a frozen dessert.

9. The lactic acid food product of claim 3, wherein said lactic acid food product is ice cream.

10. The lactic acid food product of claim 3, wherein said lactic acid food product is dried.

\* \* \* \* \*

UNITED STATES PATENT AND TRADEMARK OFFICE
CERTIFICATE OF CORRECTION

PATENT NO. : 6,368,641 B1
DATED : April 9, 2002
INVENTOR(S) : Khatchatrian et al.

It is certified that error appears in the above-identified patent and that said Letters Patent is hereby corrected as shown below:

<u>Title page, Item [54] and Column 1, lines 1-2,</u>
Please replace "LACTIC ACID BACTERIA AND FOOD PRODUCTS"
with -- LACTIC ACID FOOD PRODUCTS --.

Signed and Sealed this

Twenty-fourth Day of December, 2002

JAMES E. ROGAN
*Director of the United States Patent and Trademark Office*